United States Patent [19]

Kamoshita

[11] Patent Number: 4,963,443
[45] Date of Patent: Oct. 16, 1990

[54] FUEL CELL SYSTEM AND THE METHOD FOR OPERATING THE SAME

[75] Inventor: Tomoyoshi Kamoshita, Kanagawa, Japan

[73] Assignee: Fuji Electric Co., Ltd., Kanagawa, Japan

[21] Appl. No.: 364,273

[22] Filed: Jun. 12, 1989

[30] Foreign Application Priority Data

Jun. 23, 1988 [JP] Japan ................................. 63-155573

[51] Int. Cl.$^5$ ................................. H01M 8/18
[52] U.S. Cl. ................................. 429/17; 429/22
[58] Field of Search ................... 429/12, 13, 17, 22

[56] References Cited

U.S. PATENT DOCUMENTS 4,555,452 11/1985 Kahara et al. ........................ 429/13
4,657,826 4/1987 Tajima ................................. 429/12
4,657,828 4/1987 Tajima ................................. 429/13

FOREIGN PATENT DOCUMENTS 0022052 3/1981 Japan ................................. 429/13

Primary Examiner—Donald L. Walton
Attorney, Agent, or Firm—Finnegan, Henderson, Farabow, Garrett, and Dunner

[57] ABSTRACT

A fuel cell system in which fuel gas is supplied from a fuel gas reformer to a fuel electrode, while oxidizing gas is supplied from the air blower to a oxidizer electrode. The fuel cell system generates electricity by the reaction gas's electrochemical reaction through the electrolyte. The fuel cell system has a fuel gas circulating pipe that connects the piping for the offgas coming from the fuel electrode to the fuel gas inlet pipe of the fuel electrode through the blower and valve. It has a discharge resistance that is connected to the electric output terminal of the fuel cell. When the operation of the fuel cell is stopped, the valve at the side of offgas coming from the fuel is closed, and the valve of the fuel gas circulation pipe is opened. The fuel gas remaining in the fuel cell system circulates through this pipe. The electric power that has generated at that time is discharged through the discharge resistance. After the hydrogen in the fuel gas has been fully consumed, non-inflammable gas made up of non-reactive compounds is filled into the fuel cell.

7 Claims, 1 Drawing Sheet

FUEL CELL SYSTEM AND THE METHOD FOR OPERATING THE SAME

BACKGROUND OF THE INVENTION

Field of the Invention

The present invention relates to a fuel cell system capable of purging the reaction gas that remains in the fuel cell body when the operation of the fuel cell is suspended. This invention also relates to the method for operating the fuel cell system.

As is well known, a fuel cell system takes the form of a laminated stack of single cells in which a matrix impregnated with an electrolyte is sandwiched between fuel electrodes and oxidizer electrodes which are immersed in a common electrolyte. Electric power is generated by supplying a fuel gas containing hydrogen and an oxidizer of air or oxygen to the stack. Depending upon the electrolyte used and the working temperature at which it is used, the fuel cell system is classified as a phosphoric acid type, an alkali type, a molten carbonate, or others too numerous to list.

When the operation of a fuel cell system is started after having been stopped, there is a danger of explosion because of the possibility that fuel gas rich in hydrogen is supplied with the air or oxygen remaining in the fuel system of the cell. Similarly, when the operation of a fuel cell system is stopped, the danger of an explosion is present. If fuel gas is left in the body of the cell, the pressure of the fuel gas will decrease because of the inner discharge of the fuel cell system or because of changes in temperature, and explosive gas will be formed by the air coming into the fuel side from outside the fuel system.

To solve these problems, efforts are being made to replace the gas. For example, when starting or stopping (including emergency stops) the operation of a fuel cell system, the gas in the fuel gas supply-exhaust system usually is replaced with inactive gas like nitrogen. The gas also is replaced in the fuel cell body.

When carrying out gas replacement in a conventional fuel cell system, inactive gas always is stored and controlled in pressure cylinders and storage tanks separate from the fuel/oxidizer supply system. The inactive gas is supplied from the storage tanks to the fuel cell reactive gas system whenever operation of fuel cell system starts or stops. However, this conventional practice requires, in addition to fuel control, troublesome control procedures. These procedures include the constant monitoring of the quantity of inactive gas remaining in the inactive gas storage tank, securing inactive gas stock, and securing spare stock. Moreover, purchase and procurement, especially for movable power equipment which must have a large inactive gas storage tank, becomes large in size.

Accordingly, as disclosed in Japanese Patent Publication No. 58-32903, the applicant claimed a method to fill the oxidizing agent block chamber of a fuel cell system with nitrogen before stopping the operation of the fuel cell system. This is done by opening the external load circuit of the fuel cell system and, while supplying the fuel cell system with spontaneously diffusing air and fuel gas, connecting the external load circuit to an external short circuit installed in parallel to that external load circuit. This procedure discharges the fuel cell system and consumes oxygen present in the air of the oxidizing agent block chamber.

This method is effective for fuel cell systems using pure hydrogen without non-reactive components as fuel gas, or for fuel cell systems using fuel gas with only a few stacked cells, but has drawbacks if applied to fuel cell systems using a fuel gas with non-reactive components like a gas reformed from hydrocarbons (usually including $CO_2$) or if applied to fuel cell systems with more cells. Under these circumstances, air and fuel gas are diffused and supplied to the fuel cell system in a volume equivalent to what has been consumed in the fuel cell system. Thus, the content of non-reactive components in the gas in the fuel gas block chamber, in particular, becomes higher as the electricity is discharged in the external short circuit. This causes the gas in the fuel gas block chamber to be denser than the fuel gas with rich hydrogen supplied through spontaneous diffusion from the exterior. Consequently, the difference between the densities of both gases causes the fuel gas with rich hydrogen from the exterior to be supplied only to the top of the stacked cells. Therefore, most of the gas components in the fuel gas block chamber of each of the stacked cells in the bottom are non-reactive $CO_2$, and the discharge is stopped.

Moreover, the discharge of cells stacked in series also is stopped. Discharge therefore becomes impossible before oxygen in the air block chamber is completely consumed. This prevents the gas concentration to decrease, and hydrogen gas remains in the fuel gas block chamber on top of the cell stack. Replacement with inactive gas therefore is insufficient.

SUMMARY OF THE INVENTION

Accordingly, it is an object of the invention to provide a fuel cell system, the operation of which can be stopped safely without using an inactive gas.

It is another object of the invention to provide a fuel cell system that can be compact, and inexpensive.

It is a further object of the invention to provide a fuel cell system, the operation of which can be controlled simply.

The objects given above are accomplished by using circulating means for circulating the fuel gas in the fuel electrode through a fuel gas circulator pipe, and by using a discharge means for discharging electric power generated when operation of the fuel cell system is terminated. Additional objects and advantages of the present invention will be set forth in part in the description that follows and in part will be obvious from the description or may be learned by practice of the invention. The objects and advantages of the invention may be realized and obtained by the methods and apparatus particularly pointed out in the appended claims.

To achieve the objects and in accordance with the purpose of the invention, as embodied and as broadly described herein, a fuel cell system that generates electricity and, at the termination of operation, replaces purged gas, comprises a fuel cell body having a fuel electrode, an oxidizer electrode, and a matrix in which an electrolyte is impregnated, reformer means for reforming fuel into fuel gas, supplying means for supplying the fuel gas to the fuel electrode, air blower means for supplying air to the oxidizer electrode, exhaust means for exhausting off gas from the fuel electrode, closing means for closing the exhaust means when operation of the fuel cell system is terminated, circulating means for circulating the fuel gas in the fuel electrode when operation of the fuel cell system is terminated, and discharge means for discharging electric power when operation of the fuel cell system is terminated.

According to a further embodiment of the invention, a method of operation of a fuel cell system that generates electricity and, at the termination of operation replaces purged gas, the method comprising the steps of supplying fuel gas from reformer means to a fuel electrode of a fuel cell body; supplying air from air blower means to an oxidizer electrode of fuel cell body; exhausting off gas through exhaust means from the fuel electrode; closing the exhaust means when the operation of the fuel cell system is terminated; circulating the fuel gas in the fuel electrode by the circulating means when operation of the fuel cell system is terminated; and discharging generated electric power from the fuel cell system when operation of the fuel cell system is terminated, whereby non-inflammable gas, mainly containing non-reactive compounds in which hydrogen contained in the fuel gas is fully consumed, is filled in said fuel cell body when operation of the fuel cell system is terminated.

The accompanying drawing, which is incorporated in and constitutes a part of this specification, illustrates the preferred embodiment of the invention and, together with the description, serves to explain the principles of the invention.

DESCRIPTION OF THE PREFERRED EMBODIMENT

Figure 1:
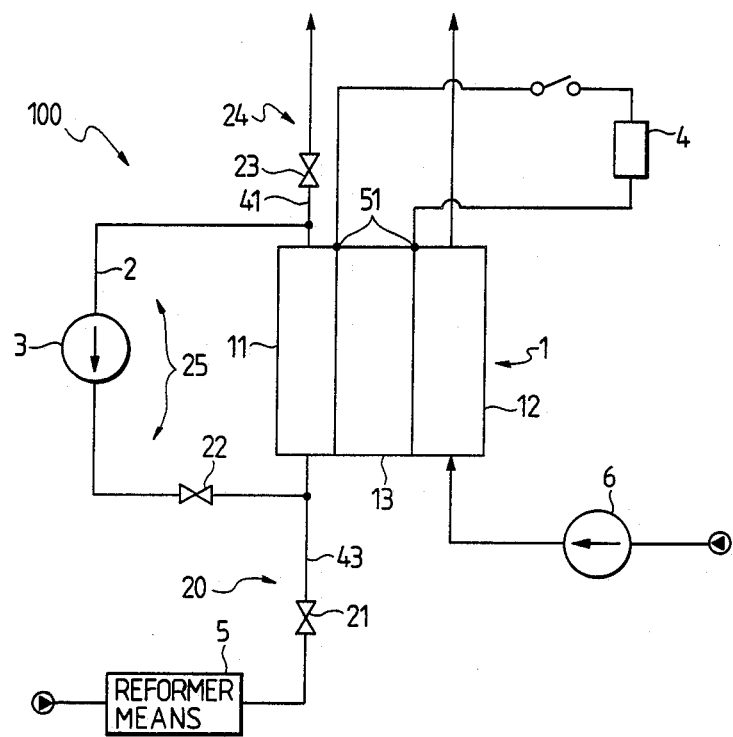
FIG. 1 is a functional block diagram that illustrates the preferred embodiment of a fuel cell system according to the present invention that generates electricity and at the termination of operation, replaces purged gas.

Reference will now be made in detail to the presently preferred embodiment of the invention, an example of which is illustrated in the accompanying drawing.

A preferred embodiment of the fuel cell system according to the present invention is shown in FIG. 1 and is generally designated by reference character 100. As explained further herein below, system 100 is a fuel cell system that generates electricity and, at the termination of operation, replaces purged gas.

According to the present invention, a fuel cell body 1 includes fuel electrode 11, oxidizer electrode 12, and matrix 13 in which electrolyte is impregnated.

According to the present invention, a reformer means is provided for reforming fuel. As embodied herein, reformer means is designated by reference character 5. Reformer means 5 is designed to convert raw fuel such as natural gas, or methanol into fuel gas that contains rich hydrogen adding water to the raw fuel.

When fuel cell system 100 is operated, fuel gas is supplied to fuel electrode 11 of fuel cell body 1 by supply means 20. A presently preferred embodiment provides that supply means 20 include a valve 21 and a fuel gas inlet pipe 43; however, other apparatus can be used and are considered within the scope of the present invention.

Furthermore, when fuel cell system 100 is operated, air blower means 6 supplies air to the oxidizer electrode 12. Also, exhaust means 24 exhausts oxygen from the fuel electrode. A presently preferred embodiment provides that exhaust means 24 include an open valve 23 and offgas pipe 41; however, other apparatus can be used within the scope of the present invention.

The presently preferred embodiment of the invention further provides a closing means for closing exhaust means 24 when operation of the fuel cell system is terminated. A presently preferred embodiment provides that closing means include a disconnecting means for disconnecting the fuel cell body's electric load (not shown) and by closing valve 23 included in exhaust means 24.

The present invention further provides a circulating means for circulating the fuel gas in fuel electrode 11 when operation of fuel cell system 100 is terminated. As embodied herein, the circulating means is designated by reference character 25. Circulating means 25 includes fuel gas circulation pipe 2, blower 3, and circulation valve 22.

Finally, the present invention provides a discharge means for discharging electric power generated when operation of the fuel cell system is terminated. As embodied herein, the discharge means is designated by reference character 4. Reference character 4 includes a discharge resistance that is connected to air output terminal 51 of fuel cell 1.

Operation of the invention will now be explained with reference to the preferred embodiment illustrated in FIG. 1. When fuel cell system 100 generates electricity, valve 22 is closed, and blower 3 also is stopped. Fuel gases are supplied from reformer 5 to fuel electrode 11 of fuel cell body 1 through valve 21. At the same time, air is supplied from air blower 6 to oxidizer electrode 12 of fuel cell body 1. As a result, fuel cell system 100 generates electricity.

When the operation of fuel cell system 100 is terminated, the exhaust of offgas from fuel electrode 11 of fuel cell body 1 is stopped by disconnecting the fuel cell body's electric load (not shown) and by closing valve 23 in exhaust means 24. The fuel gas is contained in fuel electrode 11. Next, fuel gas in fuel electrode 11 is circulated through the fuel gas circulation pipe 2 by opening valve 22 and by actuating blower 3. When discharge means 4 is connected to air output terminal 51 of fuel cell body 1, electric current flows at discharge means 4 and fuel cell system 100 is brought to the electric generating condition with discharge resistance 4 as the load. As a result, through the electrochemical reaction, the hydrogen reaction gas compound in the fuel gas, and the oxygen in the air (which is supplied to oxidizer electrode 12 by air blower 6) are consumed. At that time, the fuel gas, whose quantity is suitable for the reacted hydrogen, flows into fuel electrode 11 and discharge means 4 from reformer means 5.

When fuel gas is supplied to fuel electrode 11, the pressure of the fuel gas in circulating means 25 decreases by the quantity of consumed hydrogen before and after the electrochemical reaction, $2H_2 + O_2 = 2H_2O$, at the time of electric generation. Non-reactive compounds, which are not reactive in generating electricity, and include carbon dioxide, are accumulated in circulation means 25. As time passes, the density of the non-reactive compounds increases while the hydrogen density in the fuel gas decreases. In this way, fuel gas circulation means 25 is replaced with non-reactive compounds contained in the fuel gas.

At the same time, the quantity of consumed hydrogen is proportional to the electric current flowing to discharge means 4. This electric current is determined by the electricity generated by fuel cell system 100 and the resistance value of discharge resistance. Accordingly, when the resistance value of discharge resistance increases, the quantity of consumed hydrogen decreases. As a result, it is possible to control the reaction quantity per unit time. Therefore, it is possible to control the quantity of heat generated by the reaction If the cooling system (not shown in the drawing) of fuel cell body 1 is actuated, the generated heat easily can be removed. It will be possible to keep the temperature of fuel cell body 1 under the allowable value. After the reactive gas in circulating means 25 is consumed by the reaction, and after the non-reactive compound has accumulated, fuel gas does not flow in from reformer means 5. At this point, the gas compound including carbon dioxide contained in the fuel gas in circulation means 25 becomes non-inflamable.

With the above procedure, the fuel electrode gas replacement operation is completed. When blower 3 is stopped, and valve 22 is closed, fuel electrode 11 is sealed with non-inflammable gas.

The present invention may, therefore, be summarized as providing that when the operation of a fuel cell system that is equipped with the fuel cell body including the fuel electrode of the fuel cell body, circulation means, and discharge means that can be connected to the said fuel cell body is stopped, discharge means is connected with exhaust means closed and with the gas in the fuel electrode circulating in the gas circulating means. Air is supplied to the oxidizer electrode, and the reactive gas compound contained in the fuel electrode is decreased by the electric power generating work of the fuel cell body and by the electrode catalytic reaction. This causes the hydrogen in the fuel electrode to be replaced with non-inflammable gas. Therefore, it is possible to safely stop the fuel cell system of this invention without using the inactive gas which was necessary in the conventional method. It is unnecessary to have movable fuel cell electrical generating equipment equipped with a large tank for storing inactive gas. Therefore, the equipment can be compact, and it is unnecessary to control inactive gas. As a result, control and operation is simple. Furthermore, as no inactive gas is consumed, the cost of equipment operation is reduced.

It will be apparent to those skilled in the art that modifications and variations can be made in the fuel cell system of the present invention. The invention in its broader aspects is, therefore, not limited to the specific details, representative methods and apparatus, and illustrated examples shown and described herein. Thus, it is intended that all matter contained in the foregoing description and shown in the accompanying drawing shall be interpreted as illustrative and not in a limiting sense.

What is claimed is:

1. A fuel cell system that generates electricity and, at the termination of operation, replaces purged gas, the fuel cell system comprising:

a fuel cell body having a fuel electrode, an oxidizer electrode, and a matrix in which an electrolyte is impregnated;

reformer means for reforming fuel into fuel gas;

supplying means for supplying the fuel gas to the fuel electrode;

air blower means for supplying air to the oxidizer electrode;

exhaust means for exhausting off gas from the fuel electrode;

closing means for closing the exhaust means when operation of the fuel cell system is terminated;

circulating means for circulating the fuel gas in the fuel electrode when operation of the fuel cell system is terminated; and discharge means for discharging electric power when operation of the fuel cell is terminated, whereby non-inflammable gas, mainly containing non-reactive compounds in which hydrogen contained in the fuel gas is fully consumed, is filled in said fuel cell body when said operation of the fuel cell system is terminated.

2. The fuel cell system as recited in claim 1, wherein the supply means includes an open valve and a fuel gas inlet pipe.

3. A fuel cell system as recited in claim 1, wherein the exhaust means includes an open valve and an offgas pipe.

4. A fuel cell system as recited in claim 1, wherein the circulating means includes a fuel gas circulation pipe, a blower and a circulation valve.

5. A fuel cell system as recited in claim 1, wherein the discharge means includes a discharge resistance connected to an air output terminal of the fuel cell.

6. A method of operation of a fuel cell system that generates electricity and, at the termination of operation replaces purged gas, the fuel cell system comprising:

supplying fuel gas from reformed means to a fuel electrode of a fuel cell body;

supplying air from air blower means to an oxidizer electrode of fuel cell body;

exhausting off gas through exhaust means from the fuel electrode;

closing the exhaust means when the operation of the fuel cell system is terminated;

circulating the fuel gas in the fuel electrode by the circulating means when operation of the fuel cell system is terminated; and discharging generated electric power from the fuel cell system when operation of the fuel cell system is terminated, whereby non-inflammable gas, mainly containing non-reaction compounds in which hydrogen contained in the fuel gas if fully consumed, if filled in said fuel cell body when operation of the fuel cell system is terminated.

7. The method of operation of a fuel cell system as recited in claim 6, wherein the exhaust means includes an open valve and offgas pipe.

* * * * *

UNITED STATES PATENT AND TRADEMARK OFFICE
CERTIFICATE OF CORRECTION

PATENT NO. : 4,963,443
DATED : October 16, 1990
INVENTOR(S) : Tomoyoshi Kamoshita It is certified that error appears in the above-identified patent and that said Letters Patent is hereby corrected as shown below:

In the Abstract, Line 3, change "a" to --an--;

Column 2, Line 25, change "therefore" to --, therefore,--;

Column 2, Line 27, before "gas" insert --oxygen--;

Column 3, Line 54, before "adding" insert --by--;

Claim 1, Column 6, Line 17, after "cell" insert --system--;

UNITED STATES PATENT AND TRADEMARK OFFICE
CERTIFICATE OF CORRECTION

PATENT NO. : 4,963,443

DATED : October 16, 1990

INVENTOR(S) : Tomoyoshi Kamoshita

It is certified that error appears in the above-identified patent and that said Letters Patent is hereby corrected as shown below:

Claim 6, Column 6, line 52, change "non-reaction" to --non-reactive.

Claim 6, Column 6, line 53, change "if" to --is--;

Claim 6, Column 6, line 54, change "if" to --is--.

Signed and Sealed this

Tenth Day of November, 1992

Attest:

DOUGLAS B. COMER

*Attesting Officer*   *Acting Commissioner of Patents and Trademarks*